(12) United States Patent
Enzaki et al.

(10) Patent No.: US 6,748,897 B2
(45) Date of Patent: Jun. 15, 2004

(54) FLUID PRESSURE EQUIPMENT WITH POSITION INDICATING MECHANISM

(75) Inventors: Akira Enzaki, Tsukuba-gun (JP); Yoichi Morodomi, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/277,833

(22) Filed: Oct. 23, 2002

(65) Prior Publication Data

US 2003/0111004 A1 Jun. 19, 2003

(30) Foreign Application Priority Data

Dec. 14, 2001 (JP) ........................................ 2001-381904

(51) Int. Cl.$^7$ .............................. G01F 1/24; G01L 9/14
(52) U.S. Cl. ........................................ 116/267; 116/272
(58) Field of Search .................................. 116/264, 265, 116/266, 267, 272, 277, 281, 283, 268; 137/554; 92/5 R; 73/861.88, 861.93, 861.94

(56) References Cited

U.S. PATENT DOCUMENTS

| | | | | |
|---|---|---|---|---|
| 2,533,491 A | * | 12/1950 | McMahon et al. | ............. 251/65 |
| 2,638,582 A | * | 5/1953 | Urso et al. | ................... 116/268 |
| 3,429,291 A | * | 2/1969 | Hoffman | ..................... 116/267 |
| 3,742,970 A | * | 7/1973 | Gross | .......................... 137/100 |
| 3,980,040 A | * | 9/1976 | Read | ........................... 116/267 |
| 4,424,716 A | * | 1/1984 | Boehringer et al. | ..... 73/861.56 |
| 4,976,297 A | * | 12/1990 | Peckels | ........................ 141/95 |
| 5,320,123 A | * | 6/1994 | Corso et al. | ................... 137/1 |
| 5,329,956 A | * | 7/1994 | Marriott et al. | .......... 137/15.01 |
| 5,497,725 A | * | 3/1996 | Theisen et al. | ............. 116/277 |
| 5,602,373 A | * | 2/1997 | Sauer et al. | ............... 200/82 E |
| 5,623,967 A | * | 4/1997 | Hayashi | .................. 137/625.64 |
| 5,655,568 A | * | 8/1997 | Bhargava et al. | ........... 137/557 |
| 6,041,815 A | * | 3/2000 | Nichols | ........................ 137/556 |
| 6,220,284 B1 | * | 4/2001 | Hayashi et al. | ............. 137/554 |

* cited by examiner

*Primary Examiner*—Diego Gutierrez
*Assistant Examiner*—R. Alexander Smith
(74) *Attorney, Agent, or Firm*—Oblon, Spivak, McClelland, Maier & Neustadt, P.C.

(57) ABSTRACT

A magnet is attached to a piston which slides in the interior of a casing due to action of fluid pressure, a guide groove is provided on a side face of the casing in a movement direction of the piston, an indicator is received in the guide groove, and at least one portion of the indicator is formed of a magnetic body, so that the indicator can displace following the piston.

7 Claims, 6 Drawing Sheets

FLUID PRESSURE EQUIPMENT WITH POSITION INDICATING MECHANISM

TECHNICAL FIELD

The present invention relates to a fluid pressure equipment with a position indicating mechanism, which is provided with a piston which operates according to fluid pressure to drive a load and a position indicating mechanism which indicates an operation position of the piston.

PRIOR ART

As a fluid pressure equipment provided with a piston which operates according to action of fluid pressure, there are generally known an ordinary fluid pressure cylinder which drives an external load by a rod extending from the piston, a switching valve which is constituted so as to drive a valve member of a spool type or a poppet type, which switches flow paths for fluid, by the piston operating according to fluid pressure, and the like.

In such a fluid pressure equipment, a magnetic sensor is usually used as means for detecting an operation position of the piston and magnetic from a magnet attached to the piston is detected by the magnetic sensor so that it is detected that the piston has reached a stroke end.

However, in a conventional position detecting system using such a magnetic sensor, it is common to electrically process a detection signal outputted from the magnetic sensor by a signal processing circuit and utilize the processed signal to indicate the operation position of the piston on such display means as a light emitting diode or the like. Therefore, the system requires the complicated signal processing circuit, the display means and the like, and it can not be caused to easily indicate the operation position of the piston on the fluid pressure equipment which accommodates the piston therein.

DISCLOSURE OF THE INVENTION

A technical object of the present invention is to provide a simple position indicating mechanism to a fluid pressure equipment housing a piston therein in an additional manner, thereby allow the operation position of the piston to be viewed on the fluid pressure equipment indirectly.

According to the present invention for solving the above-described problem, there is provided a fluid pressure equipment with a position indicating mechanism, comprising a piston which slides in the interior of a casing according to action of fluid pressure to drive a load and an indicator which displaces due to a magnetic attracting force following the piston, wherein the indicator is provided on the casing so as to be visible from the outside.

According to such a fluid pressure equipment of the present invention, the indicator is provided on the casing so as to be visible from the outside and the indicator is caused to displace due to action of magnetic attracting force following the piston, so that the operation position of the piston can be viewed indirectly through the indicator without using such a complicated apparatus as a magnetic sensor or a signal processing circuit. In addition, since not only the position of the piston positioned at a stroke end but also the position thereof positioned in the course of the stroke can be indicated, when the piston has stopped in the course of the stroke due to a malfunction, the malfunction can be found through the indicator.

According to a preferred specific constitution aspect of the present invention, a magnet and a magnetic body mutually attracting each other are provided on at least one portion of the indicator and the piston, a guide groove extending in a direction of a moving direction of the piston is formed on an outer face of the casing, and the indicator is received in the guide groove so as to be movable in a state that a portion thereof has been exposed to the outside.

In this case, it is preferable that the guide groove is formed such that the width of the interior of the groove has a sectional shape wider than the width of an opening portion of the groove, the indicator is formed in a short column shape having a diameter larger than the width of the opening portion of the groove, and the indicator is received in the interior of the groove so as to be visible through the opening portion of the groove.

A marking indicating the operation position of the piston can be attached to the casing along the guide groove.

According to one constitution aspect of the present invention, such a constitution is constituted that the casing is provided with a plurality of ports, flow paths which connect these ports, and a valve member which switches communication states of the flow paths, and the piston drives the valve member as a load.

According to anther constitution aspect of the present invention, such a constitution is employed that the piston has a rod extending outside the casing, and an external load is driven by the rod.

According to still another constitution aspect of the present invention, there is provided a fluid pressure equipment with a position indicating mechanism, comprising: a valve mechanism portion having a plurality of main ports, flow paths which connect the main ports and a valve member which switches communication states of the flow paths; a cylinder portion having a piston slidable in a cylinder hole, pressure chambers formed on both sides of the piston, a plurality of operation ports communicating with the pressure chambers, and a rod coupling the piston and the valve member; and a position indicating mechanism which indicates the operation position of the piston, wherein the position indicating mechanism has the indicator.

The guide groove can also serve as an attaching groove for attaching a magnetic sensor.

DETAILED DESCRIPTION

Figure 1:
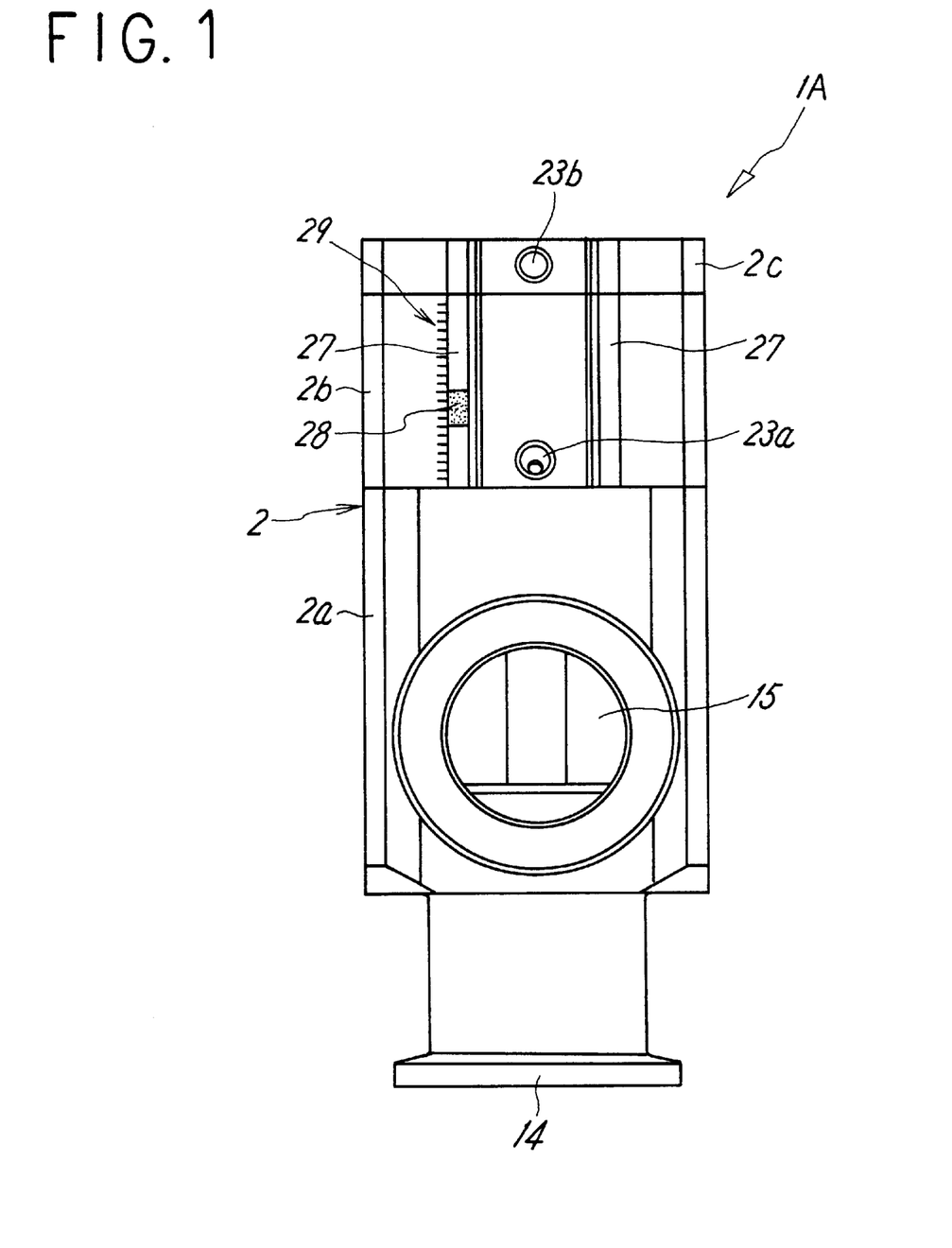
FIG. 1 is a front view showing a first embodiment of the present invention.
Figure 2:
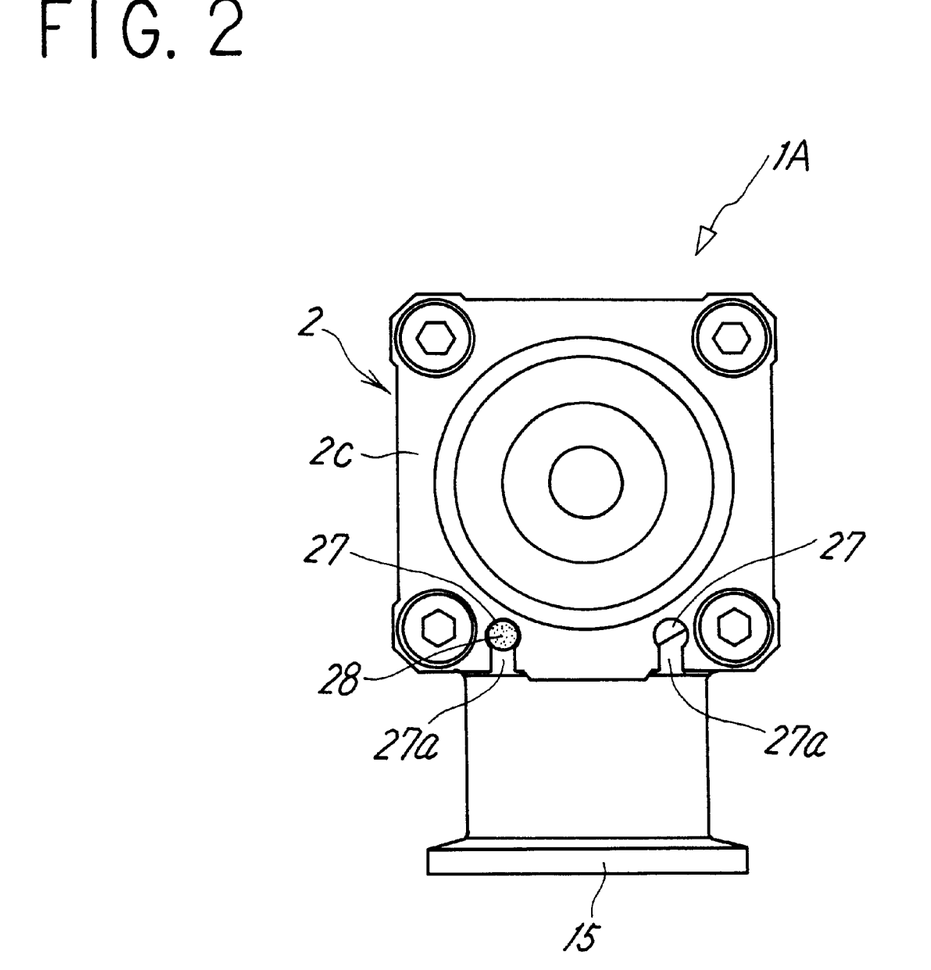
FIG. 2 is a plan view of FIG. 1.
Figure 3:
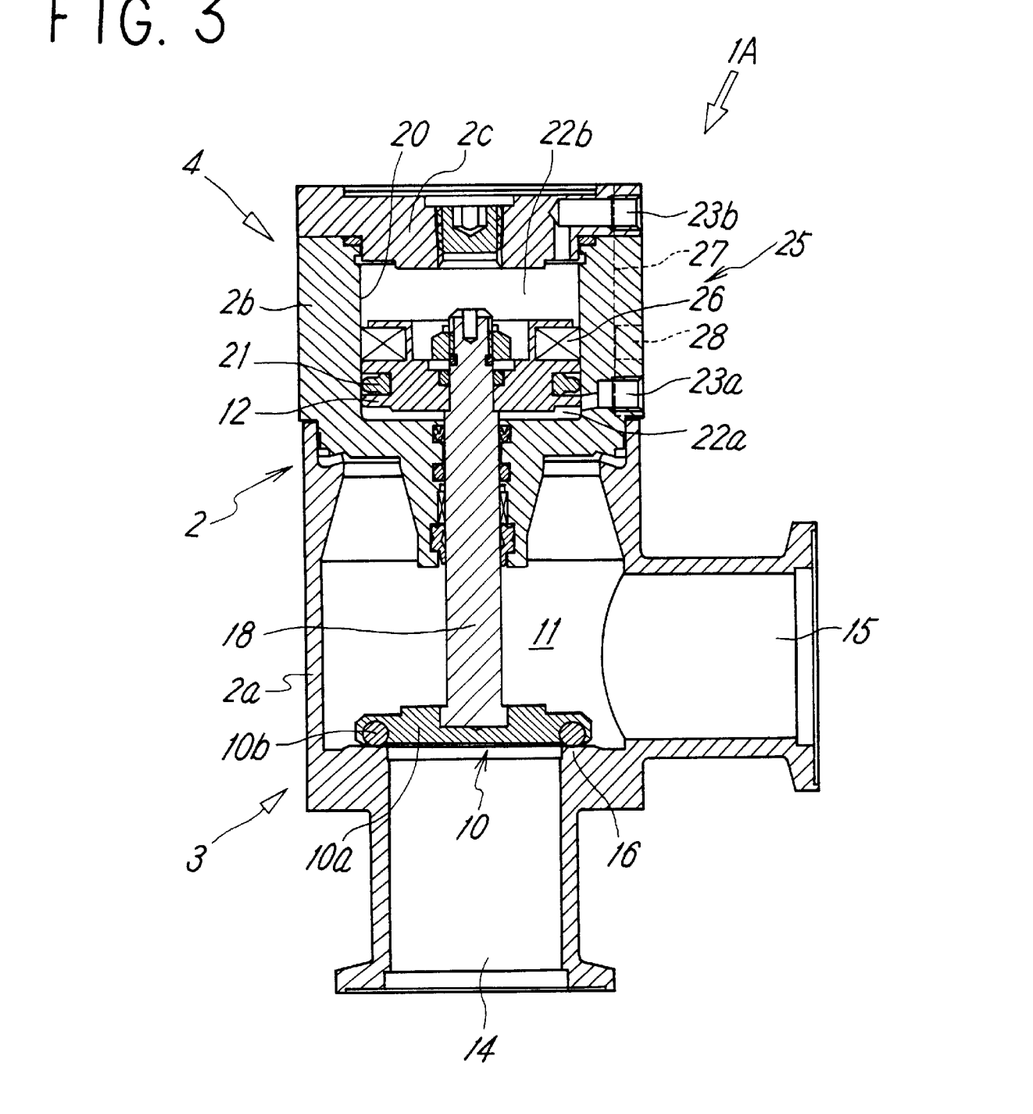
FIG. 3 is a vertical sectional view of the first embodiment in FIG. 1.

FIGS. 1 to 3 show a first embodiment of a fluid pressure equipment with a position indicating mechanism according to the present invention, and this fluid pressure equipment is a 2-port switching valve of a cylinder operating type. This switching valve 1A has a casing 2 obtained by joining a first casing portion 2a and a second casing portion 2b integrally.

A valve mechanism portion 3 constituted so as to switch a fluid flow path 11 by a valve member 10 is provided in the first casing portion 2a, and a cylinder portion 4 provided with a piston 12 driving the valve member 10 is provided in the second casing portion 2b.

The valve mechanism portion 3 has a first main port 14 and a second main port 15 formed in the first casing portion 2a in different directions at an angle of 90°, the flow path 11 connecting both the main ports 11, 12, and a valve seat 16 provided in the flow path 11, and the valve member 10 of a poppet type for opening/closing the valve seat 16 is provided in the interior of the first casing portion 2a. The valve member 10 is formed by attaching a rubber-made sealing member 10b approaching to/separating from the valve seat 16 to an outer periphery of a lower face of a disc-like base member 10a, and a distal end portion of a rod 10 is attached to a central portion of a back face of the valve member 10.

On the other hand, the cylinder portion 4 has a cylinder hole 20 formed in the interior of the second casing portion 2b and the piston 12 arranged so as to be slidable in the interior of the cylinder hole 20 via a sealing member 21, and a proximal end portion of the rod 18 is connected to the piston 12. Also, a first pressure chamber 22a and a second pressure chamber 22b are formed on both sides of the piston 12, and these pressure chambers 22a, 22b are respectively connected to a first operation port 23a and a second operation port 23b opened on a side face of the second casing portion 2b. In the figures, reference numeral 2c denotes a cover for closing an end portion of the cylinder hole 20, and the cover 2c constitutes a portion of the second casing portion 2b and the second operation port 23b is provided in this cover 2c.

A position indicating mechanism 25 for indicating the operation position of the piston 12 is provided on the cylinder portion 4. This position indicating mechanism 25 is constituted by an annular magnet 26 attached to an outer periphery of the piston 12, a guide groove 27 formed at a position on a side face of the second casing portion 2b which is close to the piston 12 along an axial direction of the piston 12 (in other words, a moving direction of the piston 12), and a short column-like indicator 28 slidably received in the guide groove 27. An entire portion or a partial portion of the indicator 28 is formed of a magnetic body. The magnetic body used in this case includes not only a material having a property which is magnetized in a magnetic field to be attracted to a magnet, such as iron, but also a magnet itself. Also, such a constitution is employed that the guide groove 27 has an exposure opening 27a with a narrow width opened on a side face of the second casing portion 2b, and a portion of the indicator 28 is exposed from the exposure opening 27a to the outside of the casing to be visible by eyes.

In the switching valve 1A having the above-described constitution, when pressure fluid such as compressed air or the like is alternately supplied to the first pressure chamber 22a and the second pressure chamber 22b from the first operation port 23a and the second operation port 23b, the piston 12 and the rod 18 advances/retracts so that the valve member 10 is driven by the rod 18 to open/close the valve seat 16. At this time, since the indicator 28 is attracted by the magnet 26 attached to the piston 12 and the indicator 28 displaces inside the guide groove 27 following the piston 12, the operation position of the piston 12 and thus the valve member 10 in an entire stroke thereof is visible on the switching valve 1A, namely, the fluid pressure equipment indirectly from the operation position of the indicator 28. Accordingly, in such a case that the piston 12 has stopped in the course of the stroke due to a malfunction, since the indicator 28 stops at the position, the malfunction can be found by the indicator 28.

Incidentally, a marking 29 comprising a scale or another mark indicating the operation position of the piston 12 can be attached to the second casing portion 2b along the guide groove 27.

In the illustrated embodiment, though the guide groove 27 is formed in a round groove-shape and the round column-shaped indicator 28 is received therein, such a configuration can be employed that the guide groove 27 is formed in a square groove and the indicator 28 is formed in a square column shape. Also, in the illustrated embodiment, two guide grooves 27, 27 are provided in parallel on the same side face of the second square casing portion 2b and the indicator 28 is received in one of the guide grooves 27, but the number of the guide grooves 27 may be one. Alternatively, one guide groove or two guide grooves can be provided for each side face on a plurality of different side faces of the casing, for example, two adjacent side faces or two opposing side faces. Furthermore, the exposure opening 27a of the guide groove 27a may be covered with a transparent cover.

Incidentally, in a case that the switching valve 1A is constituted for controlling it such that the operation position of the piston 12 is detected by a magnetic sensor, one or two attaching grooves for attaching a magnetic sensor are provided on the casing. However, in case that the position indicating mechanism 25 using the indicator 28 is further provided in such a switching valve, such a guide groove 27 as described above is provided in addition to the attaching groove for a sensor. However, in such a switching valve, when a magnetic sensor is not attached to the attaching groove, the attaching groove may also be used as the guide groove.

Also, it is preferable that at least one portion of the indicator 28 is colored to a color different from that of the casing, for example, red or the like such that the indicator is conspicuous from the outside.

Further, in the above embodiment, the magnet is attached to the piston 12 and at least one portion of the indicator 28 is formed of a magnetic body. In contrast with this, such a constitution can be employed that at least one portion of the indicator 28 is formed of a magnet and a magnetic body other than a magnet is attached to the piston 12.

Figure 4:
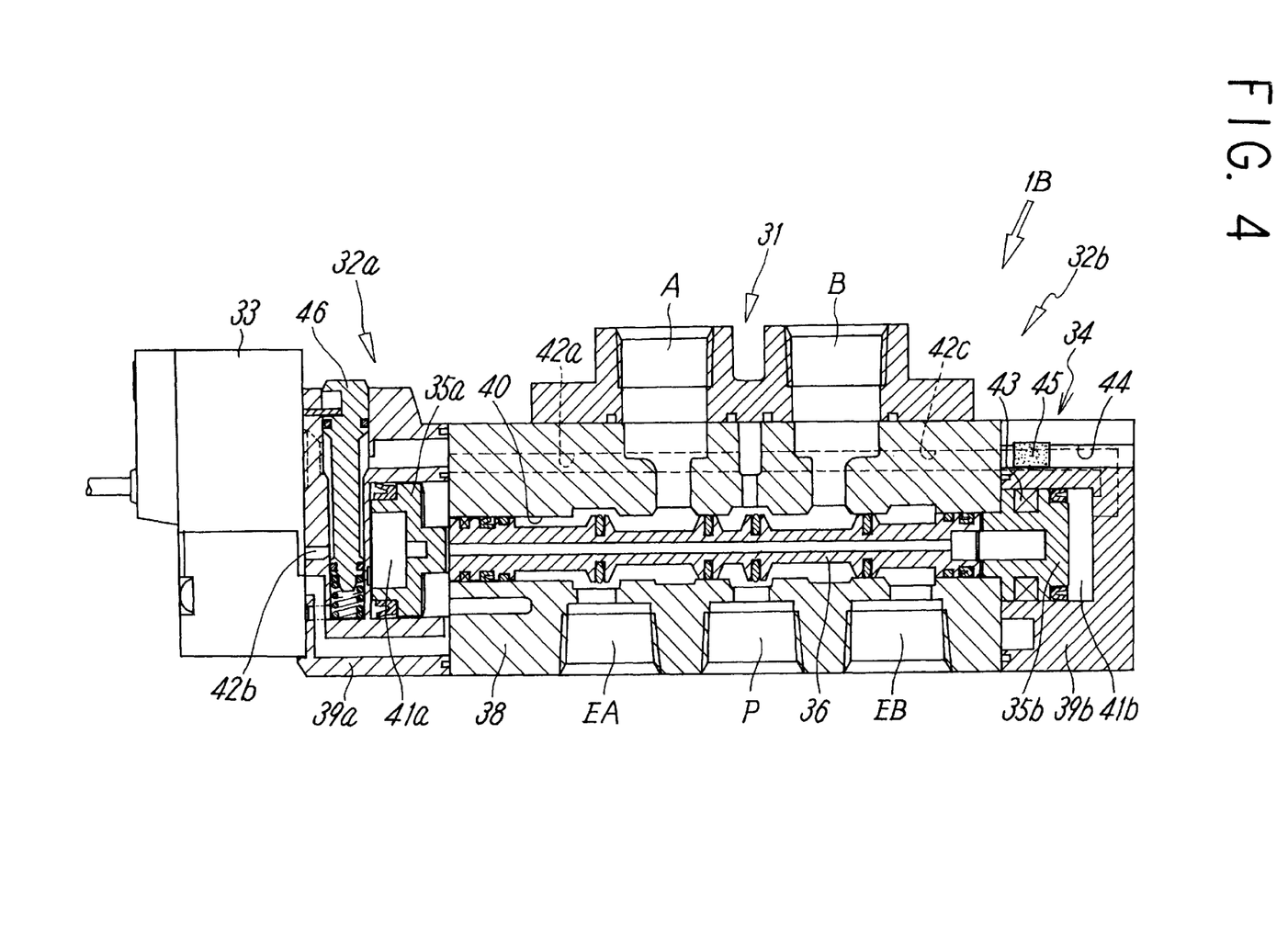
FIG. 4 is a sectional view showing a second embodiment of the present invention.

FIG. 4 shows a second embodiment of the present invention, and a fluid pressure equipment of this second embodiment is a switching valve 1B of an electromagnetic pilot type constituted such that switching of a valve member 36 of a spool type is performed by two pistons 35a, 35b driven by pilot fluid. This switching valve 1B has a valve mechanism portion 31 which accommodates the valve member 36 therein, a first cylinder portion 32a which is provided at one end side of the valve mechanism portion 31 to accommodate a large diameter piston 35a, a second cylinder portion 32b which is provided at the other end side to accommodate a small diameter piston 35b, and a pilot valve 33 which is attached to the side of first cylinder portion 32a, and a position indicating mechanism 34 is additionally provided to the second cylinder portion 32b.

The valve mechanism portion 31 is constituted such that its casing 38 is provided with a plurality of ports, namely, a supply port P, an output ports A, B and discharge ports EA, EB, and a valve hole 40 communicating with the respective ports, the valve member 36 is slidably accommodated in the valve hole 40, and switching of communication states of the flow paths connecting the respective ports is performed by sliding of the valve member 36.

Also, in the cylinder portions 32a, 32b, the above respective pistons 35a, 35b are slidably accommodated in cylinder holes inside casings 39a, 39b, and pressure chambers 41a, 41b are formed on one sides of these pistons 35a, 35b. Then, the pressure chamber 41a of the first cylinder portion 32a communicates with the supply port P via the pilot valve 33 positioned between pilot flow paths 42a, 42b, and the pressure chamber 41b of the second cylinder portion 32b always communicates with the supply port P through a pilot flow path 42c.

The pilot valve 33 is turned ON to supply pilot fluid from the supply port P to the pressure chamber 41a through the pilot flow paths 42a, 42b, so that the valve member 36 is pushed by the large diameter piston 35a to switch the valve member 36 to a position opposed to an illustrated position, and the pilot valve 33 is turned OFF to release the pressure chamber 41a to the atmosphere so that the small diameter piston 35b is pushed by pilot fluid inside the pressure chamber 41b to move the valve member 36, thereby returning the valve member 36 back to the illustrated position.

In the figure, reference numeral 46 denotes a pushing piece for manual operation, which is for realizing the same operation state as that achieved when the pilot valve 33 is electrified manually by pushing down the pushing piece.

The position indicating mechanism 34 is formed by an annular magnet 43 attached to an outer periphery of the piston 35b, a guide groove 44 formed at an externally visible position on an upper face or a side face of the casing 39b along an axial direction of the casing and an indicator 45 slidably received in the guide groove 44, and at least one portion of the indicator 45 is formed of a magnetic body. Incidentally, a marking comprising a scale or another mark can be attached along the guide groove 44.

Even in the switching valve 1B, since the indicator 45 displaces inside the guide groove 44 following motion of the piston 35b, the operation position of the piston 35b can be viewed on the switching valve indirectly through the indicator 45.

Incidentally, in the illustrated embodiment, the position indicating mechanism 34 is provided on the side of the cylinder portion 32b accommodating the small diameter piston 35b therein. However, as a switching valve 1C of a third embodiment shown in FIG. 5, the position indicating mechanism 34 may be provided on the side of the cylinder portion 32a accommodating the large diameter piston 35a therein, or the position indicating mechanisms 34 may be provided on both the cylinder portions 35a, 35b. The above-described switching valve 1C is shown as the same view as a sectional view of the switching valve 1B shown in FIG. 4 taken transversely at a central position of the valve member 36, and it has substantially the same constitution as the switching valve 1B except for the position indicating mechanism 34. In the position indicating mechanism 34 in this switching valve 1C, a magnet 43 is attached to the large diameter piston 35a, the guide groove 44 is provided on a side face of the casing 39a, and the indicator 45 is received in the guide groove 44. The other constituent portions are attached with the same reference numerals as the switching valve 1B and explanation thereof will be omitted.

Figure 5:
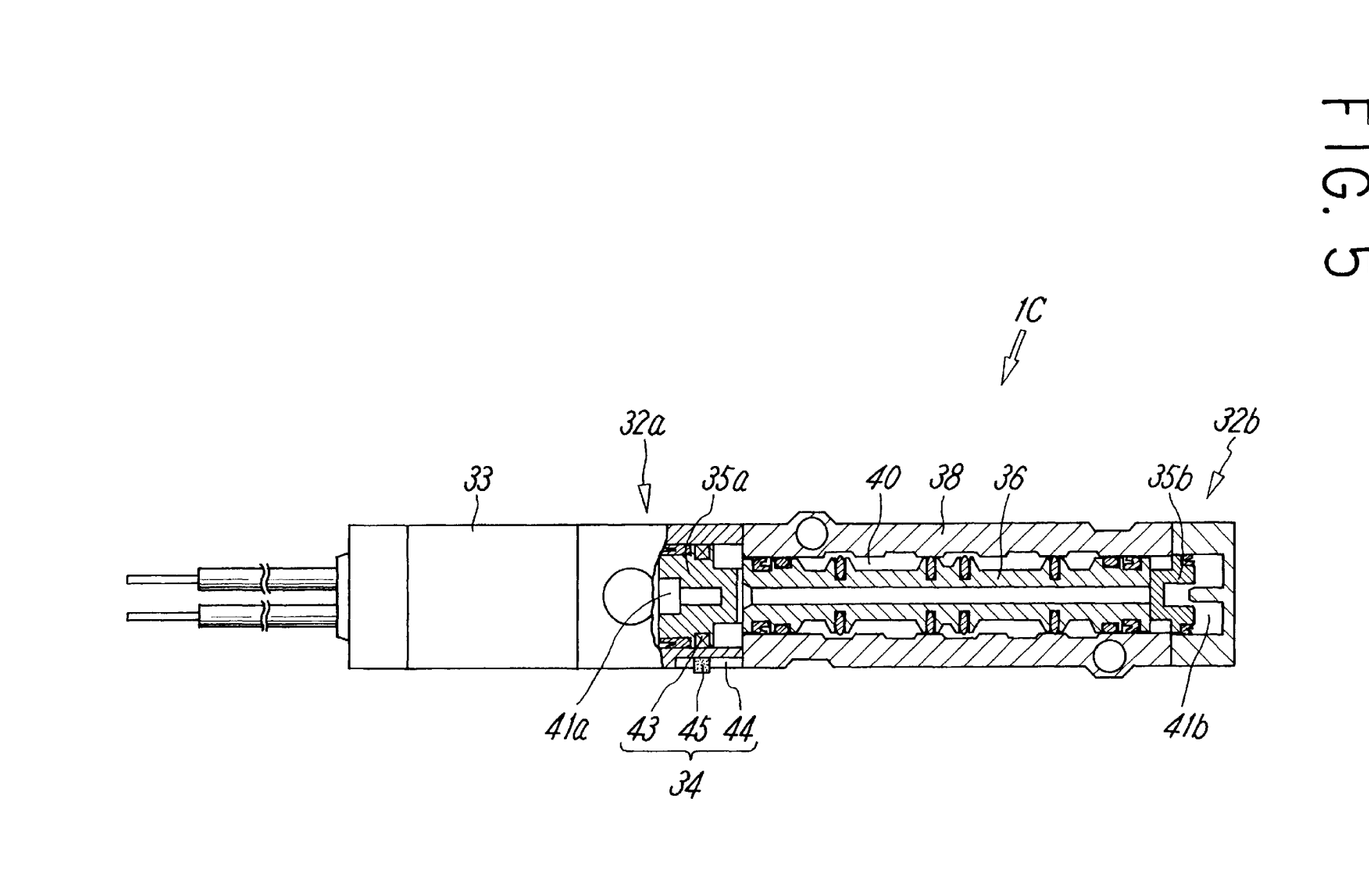
FIG. 5 is a sectional view showing a third embodiment of the present invention.

In the second and third embodiments, the 5-port switching valves of a single pilot type provided with one pilot valve 33 are shown representatively, but the present invention can be applied to even a switching valve of a double pilot type provided with two pilot valves and even a switching valve provided with the other number of ports.

Figure 6:
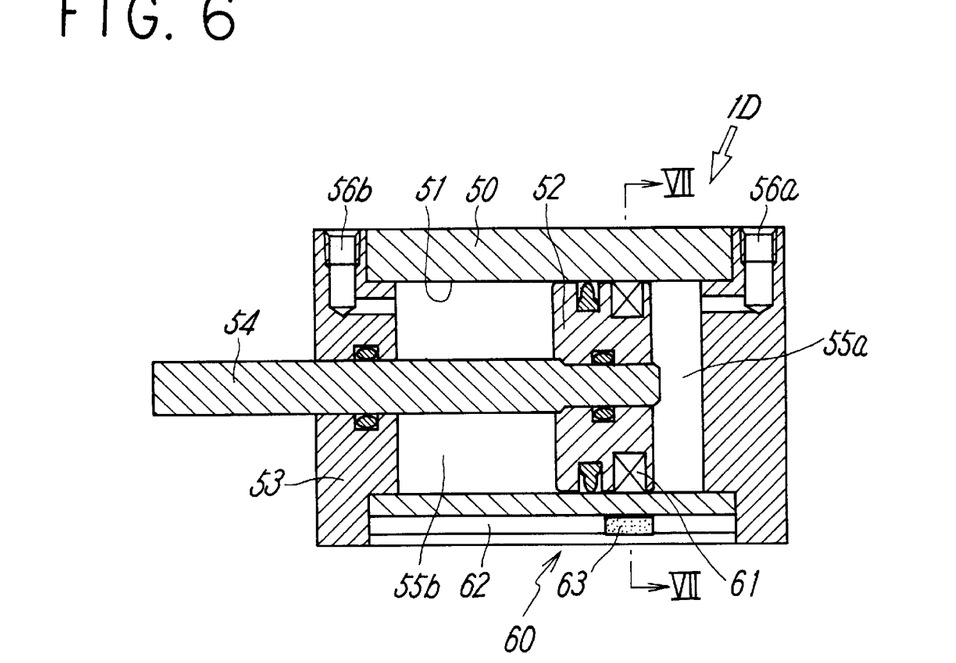
FIG. 6 is a sectional view showing a fourth embodiment of the present invention.
Figure 7:
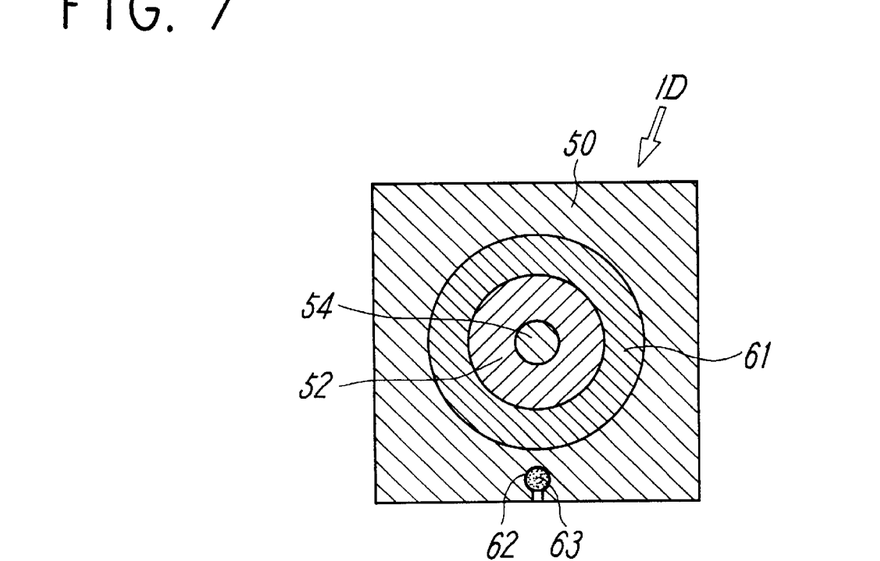
FIG. 7 is a sectional view taken along line VII—VII in FIG. 6.

FIG. 6 and FIG. 7 show a fourth embodiment of the invention, and a fluid pressure equipment of the fourth embodiment is constituted as an independent air cylinder. That is, this air cylinder ID has a round or square column-shaped casing 50, a piston 52 which is slidably accommodated in the interior of the cylinder 51 of the casing 50, a rod 54 whose proximal end portion is coupled to the piston 52 and whose distal end portion penetrates a rod cover 53 to extend to the outside, pressure chambers 55a, 55b which are formed on both sides of the piston 52 and operation ports 56a, 56b which communicate with these pressure chambers 55a, 55b, and it is constituted so as to drive an external load by the piston 52 via the rod 54.

Also, a magnet 61 is attached to the piston 52, an indicator 63 which is entirely or partially formed of a magnetic body is received in a guide groove 62 formed on a side face of the casing 50 so as to displace following the piston 52, and a position indicating mechanism 60 for indicating the operation position of the piston 52 is constituted by the magnet 61, the guide groove 62 and the indicator 63.

In the illustrated embodiment, the guide groove 62 is provided on a side face opposed to the side face on which operation ports 56a, 56b are provided, but the guide groove or guide grooves 62 may be provided on anther side face or a plurality of side faces in accordance with a direction of arrangement of the air cylinder or the like. In case that the guide grooves are provided on the plurality of side faces, guide grooves required are selectively used.

Thus, according to the present invention, by providing the indicator on the casing of the fluid pressure equipment so as to be visible from the outside and causing the indicator to displace following the piston due to action of a magnetic attracting force, the operation position of the piston can be viewed on the fluid pressure equipment in which the piston is accommodated indirectly through the indicator without using such a complicated device as a magnetic sensor or a signal processing circuit. In addition, since not only the position of the piston positioned at a stroke end but also the position thereof positioned in the course of the stroke can be indicated, when the piston has stopped in the course of the stroke due to a malfunction, the malfunction can be found easily through the indicator.

What is claimed is:

1. A fluid pressure equipment, comprising a piston which slides in the interior of a casing due to action of fluid pressure to drive a load, and an indicator which displaces following the piston due to action of a magnetic attracting force, a guide groove formed at a position close to an axial direction of the piston on an outer face of the casing and extending substantially parallel with the axial direction, the guide grove having a section shape in which the width of a groove interior is wider than that of a groove opening portion thereof, wherein the indicator is formed in a short column shape having a larger diameter than the width of the groove opening portion and is movably received into the groove interior in the guide groove so as not to project from the groove opening portion to the outside of the casing and to be visible through the groove opening portion.

2. A fluid pressure equipment according to claim 1, wherein a marking for indicating the operation position of the piston is attached along the guide groove.

3. A fluid pressure equipment according to claim 1, wherein the fluid pressure equipment has a plurality of ports, flow paths connecting the ports, and a valve member which switches communication states of the flow paths, and the load driven by the piston is the valve member.

4. A fluid pressure equipment according to claim 1, wherein the piston has a rod extending outside the casing, and the piston is constituted so as to drive an external load via the rod.

5. A fluid pressure equipment, comprising a valve mechanism portion having a first and a second main ports formed in the casing, a flow path connecting both the main ports and a valve seat provided in the flow path, and a valve member for opening/closing the valve seat; a cylinder portion having a piston which is slidable in a cylinder hole casing, pressure chambers which are formed on both sides of the piston, a plurality of operation ports which communicate with the pressure chambers, and a rod which couples the piston and a valve member to each other; and a position indicating mechanism which indicates an operation position of the piston, wherein the position indicating mechanism has a guide groove formed at a position close to an axial direction of the piston on a side of a casing in the cylinder portion and substantially parallel with the axial direction, an indicator which is movably received in the guide groove, and a magnet and a magnetic body which are provided on at least one portion of the indicator and the piston so as to attract each other mutually, and the guide groove has a sectional shape in which the width of a groove interior of the groove is wider than that of a groove opening portion thereof, the indicator is formed in a short column shape having a larger diameter than the width of the groove opening portion and is received into the groove interior in the guide groove so as to not project from the groove opening portion to the outside of the casing and to be visible through the groove opening portion.

6. A fluid pressure equipment according to claim 5, wherein a marking which indicates the operation position of the piston is attached at a position along the guide groove of the casing.

7. A fluid pressure equipment with a position indicating mechanism, comprising a valve mechanism portion having a plurality of main ports, a spool type of valve member which switches flow paths connecting main ports; a first and a second cylinder portions which are each provided on opposite sides of the valve mechanism portion and each has a piston for driving the valve member; and a position indicating mechanism which is provided on at least one cylinder portion and indicates an operation position of the piston, wherein the position indicating mechanism has a guide groove which is formed at a position close to the position on a side of a casing which receives the piston and extends substantially parallel with an axial direction of the piston, an indicator which is received in the guide groove, and a magnet and a magnetic body which are provided on at least one portion of the indicator and the piston so as to attract each other mutually, and the guide groove has a sectional shape in which the width of a groove interior of the groove is wider than that of a groove opening portion thereof, the indicator is formed in a short column shape having a larger diameter than the width of the groove opening portion and is received into the groove interior in the guide groove so as to not project from the groove opening portion to the outside of the casing and to be visible through the groove opening portion.

* * * * *